(12) United States Patent
Matsutani et al.

(10) Patent No.: US 7,278,380 B2
(45) Date of Patent: Oct. 9, 2007

(54) COOLING STRUCTURE OF CYLINDER BLOCK

(75) Inventors: Takashi Matsutani, Toyota (JP);
Takanori Nakada, Toyota (JP);
Yoshikazu Shinpo, Nisshin (JP);
Makoto Hatano, Obu (JP); Takashi Kubota, Obu (JP)

(73) Assignees: Toyota Jidosha Kabushiki Kaisha, Toyota-shi (JP); Aisan Kogyo Kabushiki Kaisha, Obu-shi (JP)

( * ) Notice: Subject to any disclaimer, the term of this patent is extended or adjusted under 35 U.S.C. 154(b) by 0 days.

(21) Appl. No.: 11/082,870

(22) Filed: Mar. 18, 2005

(65) Prior Publication Data

US 2005/0217614 A1   Oct. 6, 2005

(30) Foreign Application Priority Data

Mar. 31, 2004   (JP)   ............................. 2004-103165

(51) Int. Cl.
*F02F 1/14*   (2006.01)
*F02B 75/18*   (2006.01)

(52) U.S. Cl. ................................. 123/41.74; 123/41.79
(58) Field of Classification Search ............. 123/41.74, 123/41.72, 41.79, 193.2
See application file for complete search history.

(56) References Cited

U.S. PATENT DOCUMENTS

| | | | |
|---|---|---|---|
| 4,782,891 A | 11/1988 | Cheadle et al. | |
| 5,188,071 A | 2/1993 | Han | |
| 6,138,619 A | 10/2000 | Etemad | |
| 6,581,550 B2 * | 6/2003 | Shinpo et al. | ........... 123/41.74 |
| 6,883,471 B1 * | 4/2005 | Belter et al. | ............. 123/41.74 |

FOREIGN PATENT DOCUMENTS

| | | |
|---|---|---|
| DE | 1 220 203 | 10/1962 |
| DE | 27 56 120 A1 | 6/1979 |
| DE | 37 41 838 A1 | 6/1988 |

(Continued)

OTHER PUBLICATIONS

German Official Communication dated Jul. 26, 2006 with English translation thereof.

(Continued)

*Primary Examiner*—Stephen K. Cronin
*Assistant Examiner*—Hyder Ali
(74) *Attorney, Agent, or Firm*—Kenyon & Kenyon LLP

(57) ABSTRACT

A cooling structure for uniformly cooling a bore wall of a cylinder block using a cooling medium, the bore wall surrounding plural bore regions, includes a water jacket portion which is provided so as to surround an entire outer periphery of the bore wall, and which is supplied with the cooling medium; and a water jacket spacer which is inserted in the water jacket portion such that a space is provided between the bore wall and the water jacket spacer. The cylinder block includes an inter-bore region which is positioned in a vicinity of a boundary between the bore regions adjacent to each other, and a region other than the inter-bore region; and a cross sectional area of the space between the bore wall and the water jacket spacer in the inter-bore region is smaller than a cross sectional area of the space between the bore wall and the water jacket spacer in the region other than the inter-bore region.

2 Claims, 4 Drawing Sheets

FOREIGN PATENT DOCUMENTS

| | | |
|---|---|---|
| DE | 696 22 883 T2 | 12/1995 |
| DE | 198 40 379 C2 | 3/2000 |
| DE | 696 10 358 T2 | 4/2001 |
| DE | 103 25 753 A1 | 4/2004 |
| DE | 103 25 874 A1 | 5/2004 |
| EP | 1 167 735 A2 | 1/2002 |
| JP | 04-119330 | 10/1992 |
| JP | 2604041 * | 2/2000 |
| JP | 2002-30989 A | 1/2002 |
| JP | A 2002-030989 | 1/2002 |
| WO | WO 97/23718 | 7/1997 |

OTHER PUBLICATIONS

German Office Action dated May 26, 2006 with English translation thereof.
Office Action mailed Dec. 19, 2005, U.S. Appl. No. 11/081,732.
German Office Action dated Jul. 26, 2006 with English translation thereof.
Office Action mailed May 24, 2006, U.S. Appl. No. 11/082,876.

* cited by examiner

COOLING STRUCTURE OF CYLINDER BLOCK

INCORPORATION BY REFERENCE

The disclosure of Japanese Patent Applications No. 2004-103165 filed on Mar. 31, 2004, including the specification, drawings and abstract is incorporated herein by reference in its entirety.

BACKGROUND OF THE INVENTION

1. Field of the Invention

The invention relates to a cooling structure of a cylinder block, and more particularly to a cooling structure of a cylinder block, which makes it possible to uniformly cool the cylinder block.

2. Description of the Related Art

A conventional cooling structure of a cylinder block is disclosed, for example, in Japanese Patent Laid-Open Publication No. 2002-30989.

In the conventional cooling structure of a cylinder block disclosed in the Japanese Patent Laid-Open Publication No. 2002-30989, a temperature of a bore wall is made uniform in a circumferential direction of a bore by inserting a water jacket spacer which is separate from a cylinder block in a water jacket of the cylinder block.

However, in the conventional cooling structure of a cylinder block, an inter-bore region which is positioned in the vicinity of a boundary between bore regions adjacent to each other is not sufficiently cooled. This is thought to be because the flowing coolant has inertia, and therefore the coolant is not supplied to a sharply constricted portion between the bore regions at a sufficient flow rate, and the coolant stagnates in the inter-bore region. Also, since a cross sectional area of a passage in the inter-bore region is large, a flow speed of the coolant is reduced in the inter-bore region, and therefore the inter-bore region is not sufficiently cooled. That is, since the coolant is not supplied to the sharply constricted portion between the bore regions at a sufficient flow rate, the portion is not sufficiently cooled.

SUMMARY OF THE INVENTION

The invention is made in order to solve the aforementioned problem. It is an object of the invention to provide a cooling structure of a cylinder block, which makes it possible to uniformly cool the cylinder block.

An aspect of the invention relates to a cooling structure for uniformly cooling a bore wall of a cylinder block using a cooling medium, the bore wall surrounding plural bore regions. The cooling structure of a cylinder block includes a water jacket portion which is provided so as to surround an entire outer periphery of the bore wall, and which is supplied with the cooling medium; and a water jacket spacer which is inserted in the water jacket portion such that a space is provided between the bore wall and the water jacket spacer. The cylinder block includes an inter-bore region which is positioned in a vicinity of a boundary between the bore regions adjacent to each other, and a region other than the inter-bore region; and a cross sectional area of the space between the bore wall and the water jacket spacer in the inter-bore region is smaller than a cross sectional area of the space between the bore wall and the water jacket spacer in the region other than the inter-bore region.

In the cooling structure of a cylinder block that is thus configured, the area of the space between the bore wall and the water jacket spacer in the inter-bore region is smaller than the area of the space between the bore wall and the water jacket spacer in the region other than the inter-bore region. Therefore, in the inter-bore region, the flow speed of the coolant flowing between the water jacket spacer and the bore wall is increased. In general, as the flow speed is increased in a region, a cooling speed (a heat transfer amount per unit time) is increased in the region. Thus, it is possible to sufficiently cool the inter-bore region where heat is likely to be accumulated in a conventional case. Thus, it is possible to provide the cooling structure of a cylinder block, which makes it possible to uniformly cool the cylinder block.

Another aspect of the invention relates to a cooling structure for uniformly cooling a bore wall of a cylinder block using a cooling medium, the bore wall surrounding plural bore regions. The cooling structure of a cylinder block includes a water jacket portion which is provided so as to surround an entire outer periphery of the bore wall, and which is supplied with the cooling medium; and a water jacket spacer which is inserted in the water jacket portion such that a space is provided between the bore wall and the water jacket spacer. In the cooling structure of a cylinder block, the cylinder block includes an inter-bore region which is positioned in a vicinity of a boundary between the bore regions adjacent to each other, and a region other than the inter-bore region; and the space between the bore wall and the water jacket spacer is provided such that a contact area between the bore wall and a mainstream of the cooling medium in the inter-bore region is larger than a contact area between the bore wall and the mainstream of the cooling medium in the region other than the inter-bore region.

In the cooling structure of a cylinder block that is thus configured, the contact area between the bore wall and the mainstream of the cooling medium in the inter-bore region is larger than the contact area between the bore wall and the mainstream of the cooling medium in the region other than the inter-bore region. Therefore, in the inter-bore region, a heat transfer area is increased. In general, a heat transfer amount is proportional to the heat transfer area. As the heat transfer area is increased, a larger amount of heat is transferred. Thus, it is possible to sufficiently cool the inter-bore region. As a result, it is possible to provide the cooling structure of a cylinder block, which makes it possible to uniformly cool the cylinder block.

Another aspect of the invention relates to a cooling structure for uniformly cooling a bore wall of a cylinder block using a cooling medium, the bore wall surrounding plural bore regions. The cooling structure of a cylinder block includes a water jacket portion which is provided so as to surround an entire outer periphery of the bore wall, and which is supplied with the cooling medium; a water jacket spacer which is inserted in the water jacket portion such that a space is provided between the bore wall and the water jacket spacer; and a fin which guides the cooling medium to a boundary between the bore regions adjacent to each other, the boundary being included in the cylinder block.

In the cooling structure of a cylinder block that is thus configured, the coolant is actively guided to the boundary portion where heat is likely to be accumulated using the fin. Therefore, the boundary portion can be sufficiently cooled. As a result, it is possible to provide the cooling structure of a cylinder block, which makes it possible to uniformly cool the cylinder block.

BRIEF DESCRIPTION OF THE DRAWINGS

The above mentioned and other features, advantages, technical and industrial significance of this invention will be better understood by reading the following detailed description of exemplary embodiments of the invention, when considered in connection with the accompanying drawings, in which.

DETAILED DESCRIPTION OF THE PREFERRED EMBODIMENTS

Figure 1:
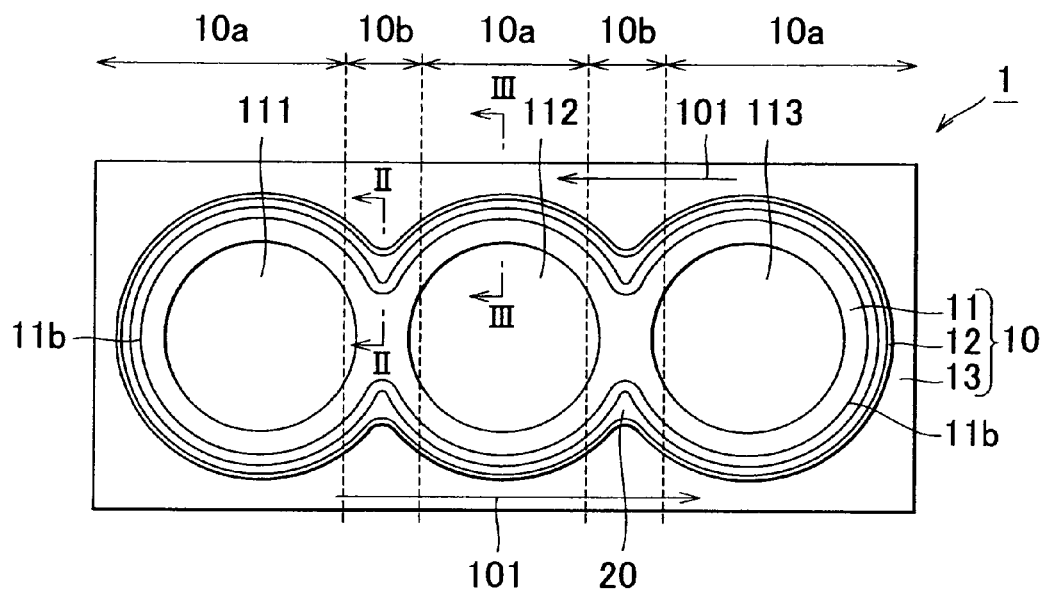
FIG. 1 is a plan view showing a cooling structure of a cylinder block according to a first embodiment of the invention.

In the following description and the accompanying drawings, the present invention will be described in more detail with reference to exemplary embodiments. In the description, the same or equivalent portions are denoted by the same reference numerals, and duplicate description thereof will be omitted.

FIG. 1 is a plan view showing a cooling structure of a cylinder block according to a first embodiment of the invention. As shown in FIG. 1, a cooling structure 1 of a cylinder block includes a water jacket portion 12 which is provided so as to surround an entire outer periphery of a bore wall 11b surrounding plural bore regions 111, 112, and 113; and a water jacket spacer 20 which is inserted in the water jacket portion 12 such that a space is provided between the bore wall 11b and the water jacket spacer 20. The temperature of the bore wall 11b is made uniform by supplying coolant which is a cooling medium to the water jacket portion 12. A cylinder block 10 includes inter-bore regions 10b each of which is positioned in the vicinity of a boundary between the bore regions adjacent to each other; and other regions 10a which are regions other than the inter-bore regions 10b. An area of a space between the bore wall 11b and the water jacket spacer 20 in the inter-bore region 10b is smaller than an area of a space between the bore wall 11b and the water jacket spacer 20 in the other region 10a which is the region other than the inter-bore region 10b.

In the cooling structure 1 of a cylinder block, the cylinder block 10 is cooled by the coolant which is the cooling medium. The cylinder block 10 includes a cylinder liner assembly 11; a water jacket portion 12 which has a groove shape, and which surrounds the cylinder liner assembly 11; and a cylinder block base portion 13 which surrounds the water jacket portion 12.

The cylinder liner assembly 11 includes three bore regions 111, 112, and 113. Each of the bore regions 111, 112, and 113 is surrounded by iron alloy, and the iron alloy is surrounded by aluminum alloy. The cylinder liner assembly 11 is surrounded by the water jacket portion 12 in which the cooling medium flows. The water jacket portion 12 has a concave shape. The water jacket portion 12 has a groove shape. Also, the water jacket portion 12 has a shape similar to a shape of the cylinder liner assembly 11 so as to surround the cylinder liner assembly 11. The cylinder block base portion 13 is an engine block main body, and is made of aluminum alloy. Each of the bore regions 111, 112, and 113 is a hollow cylindrical region. The piston is provided, and is reciprocated in each of the bore regions 111, 112, and 113. Accordingly, cylinders in the bore regions 111, 112, and 113 extend in parallel with each other, that is, axes of the cylinders in the bore regions 111, 112, and 113 extend in parallel with each other.

An inlet (not shown) for the cooling medium is provided at one portion of the cylinder block base portion 13. After the coolant is introduced through the inlet, the coolant flows in the water jacket portion 12 as shown by an arrow 101, and removes heat from the bore wall 11b. After the cooling medium removes the heat, the cooling medium is delivered to an engine head side through a gasket hole. In the engine head, the coolant cools various components constituting the engine head. One of the inter-bore regions 10b is positioned in the vicinity of the boundary between the bore regions 111 and 112, and the other inter-bore region 10b is positioned in the vicinity of the boundary between the bore regions 112 and 113. Heat is likely to be accumulated in the inter-bore regions 10b.

Figure 2:
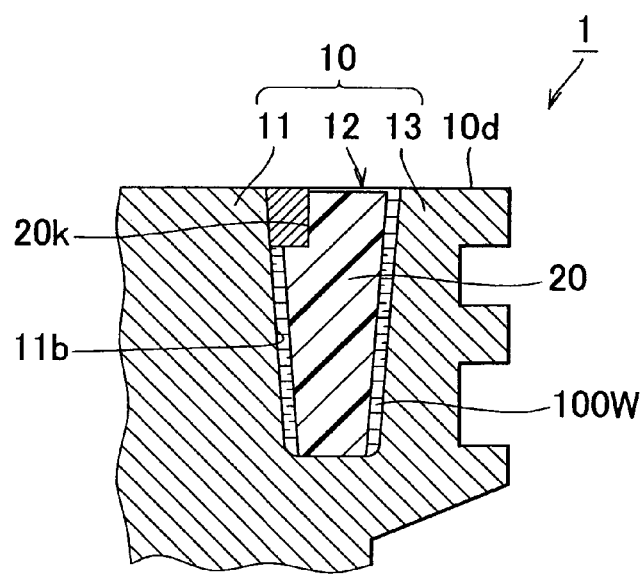
FIG. 2 is a cross sectional view taken along line II—II in FIG. 1.
Figure 3:
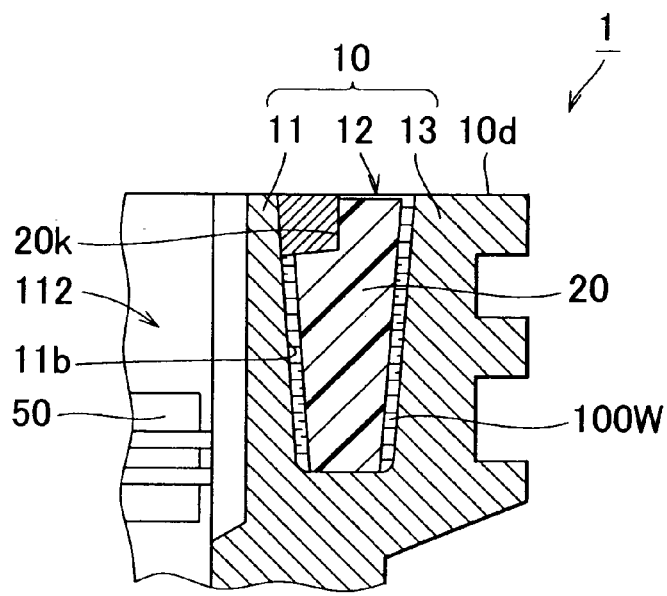
FIG. 3 is a cross sectional view taken along line III—III in FIG. 1.

FIG. 2 is a cross sectional view taken along line II—II in FIG. 1. FIG. 3 is a cross sectional view taken along line III—III in FIG. 1. As shown in FIG. 2 and FIG. 3, the cylinder block 10 includes the cylinder liner assembly 11 which is provided inside the cylinder block 10; the water jacket portion 12 which is provided so as to surround the cylinder liner assembly 11, and which serves as the cooling medium passage; and the cylinder block base portion 13 which surrounds the water jacket portion 12, and which is opposed to the cylinder liner assembly 11.

The cylinder liner assembly 11 includes the bore region 112 in which a piston 50 is inserted. The bore region 112 is a hollow region having a substantially cylindrical shape. The plural bore regions are arranged in one direction.

In this embodiment, the three bore regions are provided. However, the number of the bore regions is not limited to three. The number of the bore regions may be variously changed. The cylinder liner assembly 11 includes the bore wall 11b. The bore wall 11b is cooled by coolant 100W. Heat generated in the bore region 112 is dissipated from the bore wall 11b to the coolant 100W.

The water jacket portion 12 is a V-shaped portion, and has a depth and width sufficient for housing the water jacket spacer 20. In this embodiment, the cylinder block 10 is an open deck type cylinder block. The water jacket portion 12 is exposed at a deck surface 10d. The water jacket portion 12 is provided between the cylinder liner assembly 11 and the cylinder block base portion 13. The water jacket spacer 20 is inserted in the water jacket portion 12. The water jacket portion 12 includes a bottom portion. The cylinder liner assembly 11 is connected to the cylinder block base portion 13 at the bottom portion of the water jacket portion 12. A wall surface constituting the water jacket portion 12 has a substantially taper shape.

The cylinder block base portion 13 is made of aluminum alloy. The cylinder block base portion 13 is formed by die casting. The material used for forming the cylinder liner assembly 11 and the cylinder block base portion 13 is not limited to a specific material. The cylinder liner assembly 11 and the cylinder block base portion 13 may be made of cast iron, instead of aluminum alloy. The cylinder block base portion 13 serves as an engine block. Various auxiliary machines that need to be provided in an engine are fitted to the cylinder block base portion 13.

A cut portion 20k is provided in the water jacket spacer 20 so as to be opposed to the bore wall 11b. The cut portion 20k has a rectangular cross section. However, the cut portion 20k may have a circular cross section, an oval cross section, or the like. Since the cut portion 20k is provided, a flow rate of the coolant 100W is increased in this cut portion 20k. That is, as shown in FIG. 1, the coolant flows in a direction shown by an arrow 101. The flow of the coolant includes two flows, that are, a flow between the cylinder block base portion 13 and the water jacket spacer 20, and a flow between the water jacket spacer 20 and the cylinder liner assembly 11 (bore wall 11b). The coolant flowing between the water jacket spacer 20 and the bore wall 11b mainly contributes to cooling. When the flow rate of the coolant flowing between the water jacket spacer 20 and the bore wall 11b is increased, the temperature of the bore wall 11b is decreased.

As shown in FIG. 2 and FIG. 3, in this embodiment of the invention, the cut portion 20k is provided in the water jacket spacer 20 in the vicinity of the deck surface 10d. Thus, it is possible to ensure a necessary flow rate, and to sufficiently dissipate heat at this cut portion 20k. Further, as shown in FIG. 2 and FIG. 3, in the inter-bore region 10b in FIG. 2, the cross sectional area of the passage for the coolant shown by hatching is small. Meanwhile, in the other region 10a in FIG. 3, the cross sectional area of the passage for the coolant shown by hatching is large. The cross sectional area is perpendicular to the flow of the coolant. Therefore, when the flow rate of the coolant flowing between the water jacket spacer 20 and the bore wall 11b is constant, the flow speed is increased in the inter-bore region 10b since the area of the passage is small in the inter-bore region 10b as shown in FIG. 2. In the other region 10a, the flow speed is decreased since the area of the passage is large as shown in FIG. 3.

In general, a heat transfer amount (an amount of heat transferred per unit time) is decided depending on a temperature difference, a heat transfer area, and the flow speed. As the flow speed is increased, the heat transfer amount is increased. This is thought to be because cold coolant frequently contacts the heat transfer surface, and an interface is renewed. According to this invention, in the inter-bore region 10b, the flow speed can be increased by making the passage for the coolant narrow, as shown in FIG. 2. Thus, it is possible to actively cool the inter-bore region 10b. That is, the flow speed in the inter-bore region 10b is increased by making the cross sectional area of the passage for the coolant in the general region shown in FIG. 3 larger than the cross sectional area of the passage for the coolant in the inter-bore region shown in FIG. 2. As a result, cooling in the inter-bore region is promoted. FIG. 2 and FIG. 3 show an example in which the cut portion 20k is provided. However, the invention is not limited to this example. The flow speed in the inter-bore region 10b may be increased and the flow speed in the other region 10a may be decreased by changing the shape of the bore wall 11b.

The cut portion 20k is provided in the vicinity of the deck surface 10d. However, the position at which the cut portion 20k is provided is not limited to the position in the vicinity of the deck surface 10d. The cut portion 20k may be provided at another portion. For example, the cut portion may be provided in the water jacket spacer 20 in the vicinity of the bottom portion of the water jacket portion 12.

In the cooling structure 1 of a cylinder block according to the first embodiment of the invention, the flow speed in the inter-bore region 10b is increased, and cooling in the inter-bore region 10b is promoted by decreasing the cross sectional area of the passage for the coolant in the inter-bore region 10b. As a result, the inter-bore region 10b where heat is likely to be accumulated can be actively cooled. Accordingly, it is possible to provide the cooling structure of a cylinder block, which makes it possible to uniformly cool the cylinder block.

Figure 4:
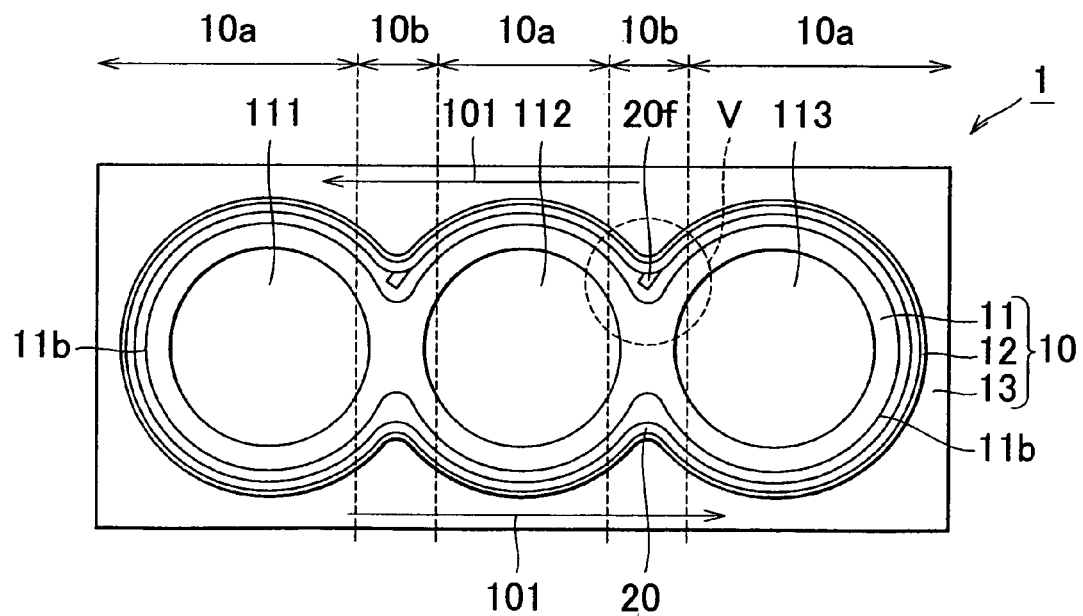
FIG. 4 is a plan view showing a cooling structure of a cylinder block according to a second embodiment of the invention.
Figure 5:
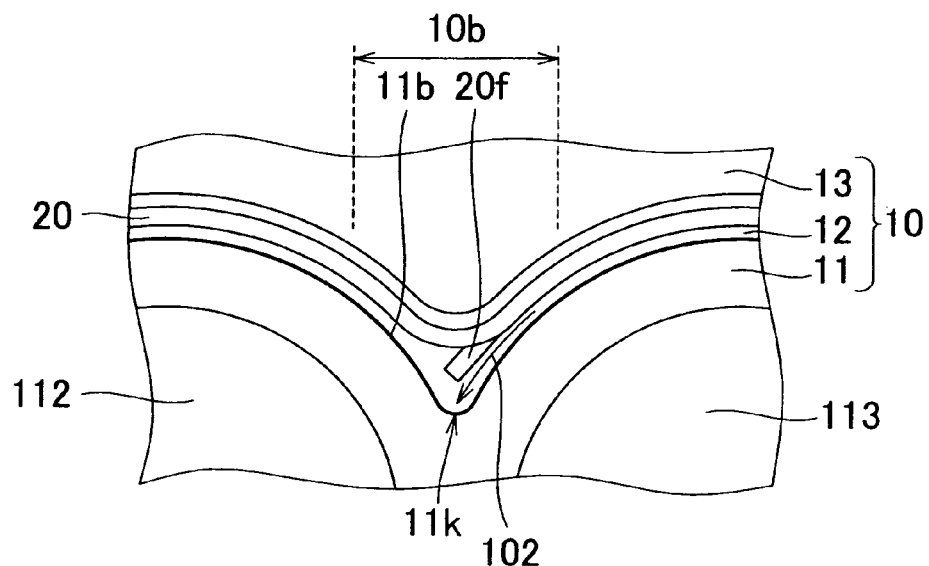
FIG. 5 is a plan view showing an enlarged portion indicated by a dotted circle V in FIG. 4.

FIG. 4 is a plan view showing a cooling structure of a cylinder block according to a second embodiment of the invention. FIG. 5 is a plan view showing an enlarged portion indicated by a dotted circle V in FIG. 4. As shown in FIG. 4 and FIG. 5, the cooling structure 1 of a cylinder block according to the second embodiment is different from the cooling structure 1 of a cylinder block according to the first embodiment in that a fin 20f is provided in the water jacket spacer 20 in the inter-bore region 10b. The fin 20f is provided so as to be opposed to the bore wall 11b such that a given space is provided between the bore wall 11b and the fin 20f. The fin 20f is provided integrally with the water jacket spacer 20. The fin 20f may be separated from the water jacket spacer 20. That is, for example, when the water jacket spacer 20 is made of resin, the fin 20f may be formed integrally with this resin. Also, the fin 20f made of metal may be fitted to the water jacket spacer 20 made of resin in a subsequent process.

The coolant flows between the fin 20f and the bore wall 11b in a direction shown by an arrow 102 in FIG. 5. Since the fin 20f is provided, an area between the bore wall 11b and the fin 20f which is a portion of the water jacket spacer 20 is small.

The fin 20f has a protrusion shape in FIG. 4 and FIG. 5. However, the shape of the fin 20f is not limited to this shape. The fin 20f may have a shape similar to a shape obtained by adding a separate cylindrical portion to the constricted portion of the water jacket spacer 20. The fin 20f has a function of forcibly guiding the flow of the coolant in the inter-bore region 10b. That is, since the coolant has inertia, the coolant is unlikely to flow to a boundary 11k which is the most constricted portion in the inter-bore region 10b, and is likely to stagnate in the boundary 11k in the inter-bore region 10b. However, since the fin 20f is provided, it is possible to actively supply the coolant to the boundary 11k where the coolant is likely to stagnate, and to renew the interface at this portion. Therefore, the coolant is prevented from stagnating, and the temperature of the inter-bore region 10b can be reduced.

That is, in the second embodiment, the fin 20f for guiding the flow of the coolant to the inter-bore region 10 is provided in the water jacket spacer 20 on an upstream side of the inter-bore region 10. Thus, the area of the passage is substantially reduced, and cooling efficiency can be improved.

Figure 6:
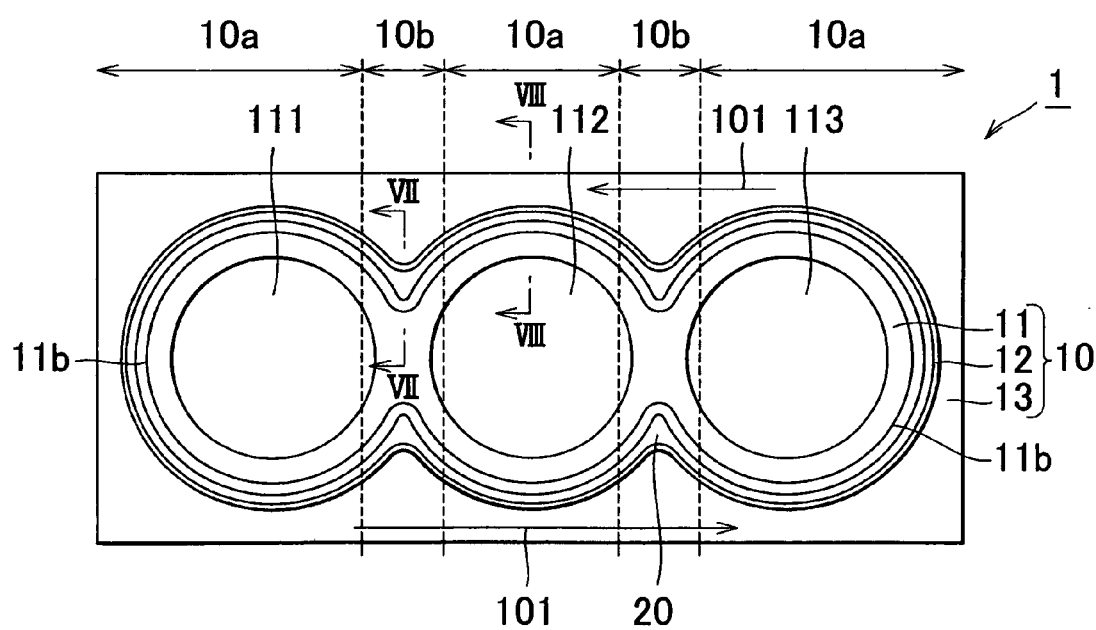
FIG. 6 is a plan view showing a cooling structure of a cylinder block according to a third embodiment of the invention.
Figure 7:
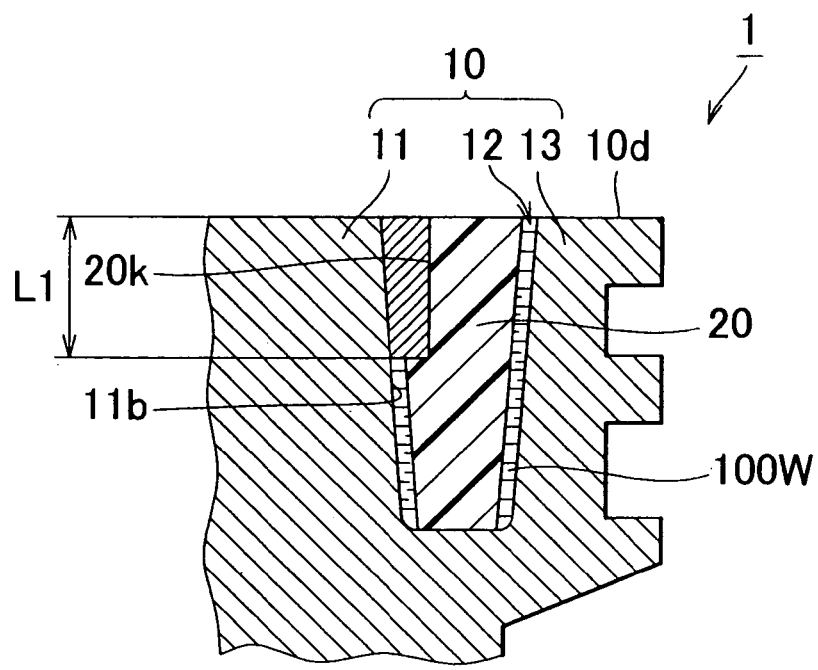
FIG. 7 is a cross sectional view taken along line VII—VII in FIG. 6.
Figure 8:
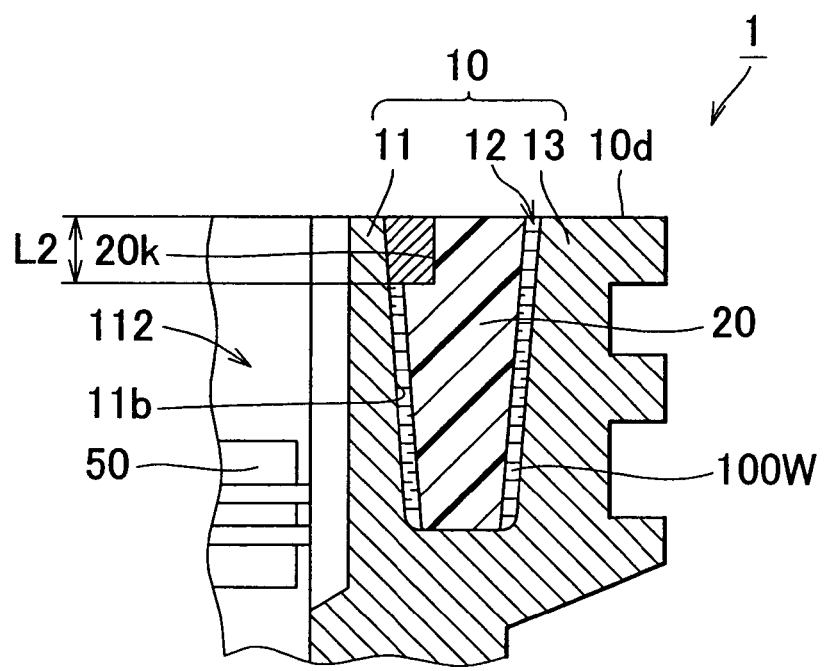
FIG. 8 is a cross sectional view taken along line VIII—VIII in FIG. 6.

FIG. 6 is a plan view showing a cooling structure of a cylinder block according to a third embodiment of the invention. FIG. 7 is a cross sectional view taken along line VII—VII in FIG. 6. FIG. 8 is a cross sectional view taken along line VIII—VIII in FIG. 6. The cooling structure 1 of a cylinder block according to a third embodiment of the invention will be described with reference to FIG. 6 to FIG. 8. As shown in FIG. 7 and FIG. 8, a contact area between the coolant 100W and the bore wall 11b in the inter-bore region 10b is made larger than a contact area between the coolant 100W and the bore wall 11b in the other region 10a.

As described above, the heat transfer amount in the bore wall 11b is decided depending on the heat transfer area. That is, as the heat transfer area (the contact area between the main stream of the coolant and the bore wall 11b) is increased, the heat transfer amount is increased, and the bore wall 11b can be sufficiently cooled. As shown in FIG. 7 and FIG. 8, in this embodiment of the invention, the cut portion 20k is provided in the water jacket spacer 20. When a length L1 of the cut portion 20k in the inter-bore region 10b and a length L2 of the cut portion 20k in the other region 10a are compared to each other, the length L1 of the cut portion 20k in the inter-bore region 10b is longer than the length L2 of the cut portion 20k in the other region 10a. Each of the hatched regions in FIG. 7 and FIG. 8 is the region where the main stream of the coolant flows between the bore wall 11b and the water jacket spacer 20. The amount of heat dissipated from the bore wall 11b is decided depending on the contact area between this region and the bore wall 11b. In the inter-bore region 10b, since the cut portion 20k has a large depth, the contact length L1 is long, as shown in FIG. 7. In the other region 10a, since the cut portion 20k has a small depth, the contact length L2 is short, as shown in FIG. 8. Since a length in a direction perpendicular to a surface of paper on which FIG. 7 is printed is the same as a length in a direction perpendicular to a surface of paper on which FIG. 8 is printed, the contact area between the coolant and the bore wall 11b in the inter-bore region 10b shown in FIG. 7 is larger than the contact area in the other region 10a shown in FIG. 8.

That is, the cooling structure 1 of a cylinder block according to the third embodiment of the invention includes the water jacket portion 12 which is provided so as to surround an entire outer periphery of the bore wall 11b surrounding plural bore regions 111, 112, and 113; and a water jacket spacer 20 which is inserted in the water jacket portion 12 such that a space is provided between the bore wall 11b and the water jacket spacer 20. The temperature of the bore wall 11b is made uniform by supplying the coolant 100W that is the cooling medium to the water jacket portion 12. The cylinder block 10 includes the inter-bore regions 10b one of which is positioned in the vicinity of the boundary between the bore regions 111 and 112, and the other of which is positioned in the vicinity of the boundary between the bore regions 112 and 113; and other regions 10a which are regions other than the inter-bore regions 10b. The space between the bore wall 11b and the water jacket spacer 20 is provided such that the contact area between the bore wall 11b and the main stream of the coolant 100W in the inter-bore region 10b is larger than the contact area between the bore wall 11b and the coolant 100W in the other region 10a.

That is, according to this invention, transfer of heat from the bore wall 11b is promoted by increasing the contact area between the main stream of the coolant 100W flowing between the water jacket spacer 20 and the bore wall 11b, and the bore wall 11b in the inter-bore region 10b.

In each of the first and second embodiments, the flow speed of the coolant is increased by reducing the area of the passage. Meanwhile, in the third embodiment, though the area of the passage is not changed in the inter-bore region 10b, the area in which the coolant 100W contacts the bore wall 11b that is the inner wall of the water jacket portion (i.e., a cooled area) is increased in the inter-bore region 10b. Thus, it is possible to uniformly cool the cylinder block.

Although the embodiments of the invention have been described, various modifications can be made to the embodiments. In the embodiments, the coolant makes a U-turn, and the direction in which the coolant flows is reversed, as shown in FIG. 1. However, the flow of the coolant is not limited to this. The coolant may flow in only one direction, that is, the coolant may flow only in a longitudinal direction of the cylinder block 10. In this case, after the coolant is introduced to the water jacket portion 12 at one end portion in the longitudinal direction of the cylinder block 10, the flow of the coolant is divided into two streams so as to cool the bore wall 11b on each of right and left sides in the longitudinal direction. Then, the coolant is discharged from the other end portion in the longitudinal direction, and the coolant cools other equipment or is delivered to the radiator.

Also, the material used for forming the water jacket spacer 20 is not limited to resin. The water jacket spacer 20 may be made of various materials such as metal and non metal.

Further, in the aforementioned embodiments, the coolant 100W is used as the cooling medium. However, the cooling medium is not limited to the coolant. As the cooling medium, long-life coolant, liquids such as oil (lubricating oil or cooling oil), or high-pressure gas may be used.

The invention can be applied to a gasoline engine and a diesel engine. Also, the engine to which the invention is applied may have any number of plural cylinders. That is, the invention can be applied to the engine which has two or more cylinders. Also, the invention can be applied to various engines such as an in-line engine, a V-type engine, a W-type engine, and a horizontal opposed engine.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less ore only a single element, are also within the spirit and scope of the invention.

What is claimed is:

1. A cooling structure for uniformly cooling a bore wall of a cylinder block using a cooling medium, the bore wall surrounding plural bore regions, comprising:
    a water jacket portion which is provided so as to surround an entire outer periphery of the bore wall, and which is supplied with the cooling medium;
    a water jacket spacer which is inserted in the water jacket portion such that a space is provided between the bore wall and the water jacket spacer; and
    a fin having a side opposed to the bore wall such that a given space is provided between the bore wall and the side of the fin and which guides the cooling medium to a boundary between the bore regions adjacent to each other, the boundary being included in the cylinder block.

2. The cooling structure of a cylinder block according to claim 1, wherein the fin is provided integrally with the water jacket spacer.

* * * * *